(No Model.)

J. B. HARRIS.
TRACTION ENGINE.

No. 434,131. Patented Aug. 12, 1890.

Witnesses:
Geo. H. Strong.
J. H. Morse.

Inventor,
Jerome B. Harris
By Dewey & Co.
atty.

UNITED STATES PATENT OFFICE.

JEROME B. HARRIS, OF STOCKTON, CALIFORNIA, ASSIGNOR OF ONE-HALF TO JOHN GAMBETTI, OF SAME PLACE.

TRACTION-ENGINE.

SPECIFICATION forming part of Letters Patent No. 434,131, dated August 12, 1890.

Application filed May 19, 1890. Serial No. 352,401. (No model.)

*To all whom it may concern:*

Be it known that I, JEROME B. HARRIS, a citizen of the United States, residing at Stockton, San Joaquin county, State of California, have invented an Improvement in Traction-Engines; and I hereby declare the following to be a full, clear, and exact description of the same.

My invention relates to the general class of traction-engines, and particularly to the driving mechanism therefor.

It consists in the novel construction hereinafter fully described, and specifically pointed out in the claims.

The object of my invention is to so arrange the driving mechanism that when called into action, and while operating, the dead-weight of the frame and the carried parts is transferred from the axis of the carrying or driving wheels to a point outside of or beyond said axis and near the wheel's rim, whereby said weight is utilized to assist the positive power in turning or driving the wheels.

Figure 1:
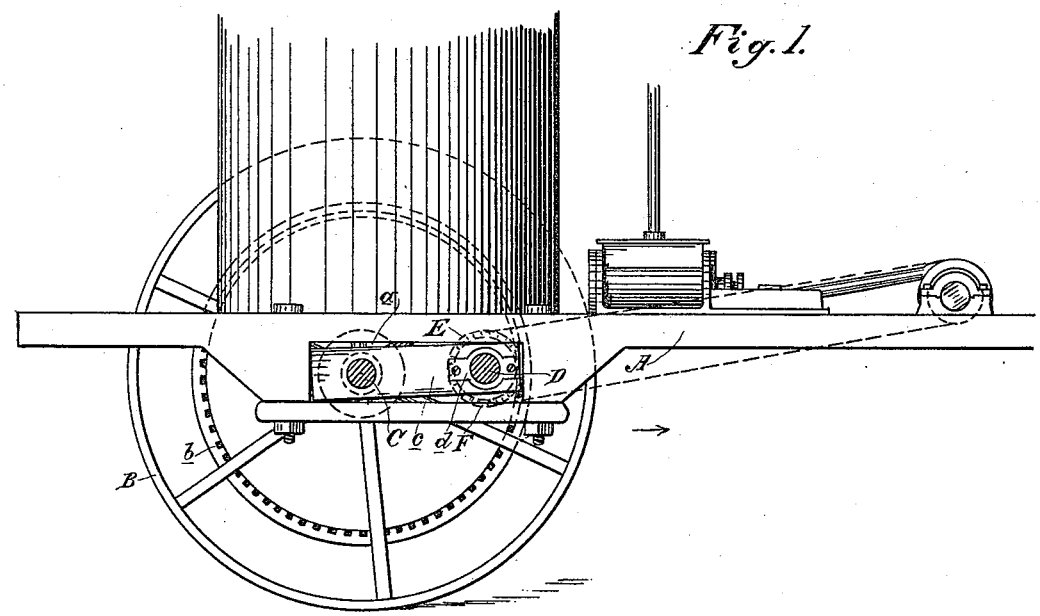
Figure 2:
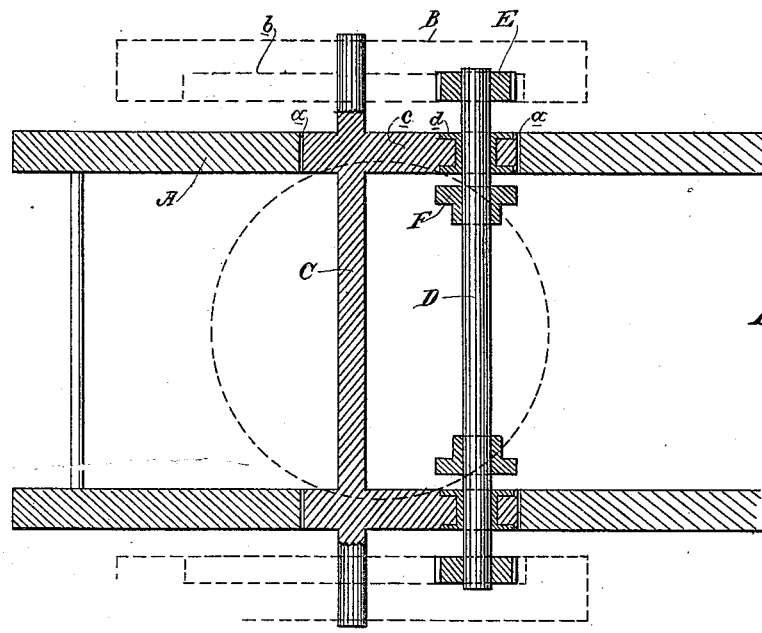

Referring to the accompanying drawings for a more complete explanation of my invention, Figure 1 is a side elevation of my traction-engine, the rear wheel being removed. Fig. 2 is a horizontal section.

I have not deemed it necessary to show herein a traction-engine in full, as my invention can be fully understood by representing A as the frame, or a portion thereof, of a traction-engine, supposed to be provided with a suitable number of wheels, and to carry a boiler, engine, and other parts common to these vehicles.

B is a driving-wheel of the vehicle. It is provided with a fixed gear $b$, through which it is driven.

C is the main or wheel axle, upon the ends of which the driving-wheels are mounted.

D is the supplemental or pinion axle journaled in boxes $d$, which are carried by and firmly connected with arms $c$, which project forwardly from the main or wheel axle, and are rigidly connected or formed with said main axle. These arms $c$ and the boxes $d$ which they carry are confined within the long boxes $a$ of the frame A, said boxes $a$ being sufficiently capacious in point of depth to allow a slight vertical movement of said arms and boxes $d$.

Carried by the ends of the supplemental axle D are the pinions E, which engage the gears $b$ of the driving-wheels.

F are suitable pulleys upon axle D, intended to receive chains or belts from the engine, whereby said axle is driven, and said axle, through its pinions, drives wheels B.

The effect of this construction may be thus stated: When the machine is at rest, the whole weight is carried by the main or wheel axle C; but when the power is applied the tendency of the pinions E is to climb up the gears $b$, and this is, in fact, effected by reason of the freedom which the arms $c$ and boxes $d$ have in the boxes $a$ of the frame. This transfers the weight of the machine from the main axle forward toward the supplemental axle, and the whole weight is carried by the intermeshing teeth of the gears. Therefore as this meshing occurs beyond the wheel-center nearer its rim the dead-weight is utilized at a point on the wheel where advantage can be taken of a leverage equal to the distance between the wheel's axis and the gear-teeth, and this leverage, upon which the dead-weight acts, assists in turning the wheel and supplements the positive driving-power. This effect may be likened to that of the familiar expedient of men applying their power and weight to the wheel-spokes forward of the axle to assist the horses in starting a vehicle. Therefore by my construction when the machine is starting and advancing it has not only the positive driving-power of the engine, but also a supplementary power constantly acting and due to the weight of the machine bearing down on the wheel near its rim.

Having thus described my invention, what I claim as new, and desire to secure by Letters Patent, is—

1. In a traction-engine, and in combination with its driving-wheels having gears $b$ by which they are rotated, a main axle carrying said wheels, a rotary supplemental axle connected by rigid arms with the main axle and having a vertical play in the boxes of the traction-engine frame, said supplemental axle being driven from the engine, and having pinions engaging the gears of the driving-wheels, substantially as herein described.

2. In a traction-engine, and in combination with its frame and driving wheels having the gears $b$ by which they are rotated, the main axle, on the ends of which the driving-wheels are carried, the rigid arms $c$ of said axle, the boxes $d$, carried by the forward ends of said arms, the boxes $a$ of the traction-engine frame, in which the arms $c$ and boxes $d$ have a vertical play, the supplemental axle carried by boxes $d$ and driven from the engine, and the pinions on said axle engaging the gears of the driving-wheels, substantially as herein described.

In witness whereof I have hereunto set my hand.

JEROME B. HARRIS.

Witnesses:
CON COLLINS,
FRANK F. BUTLER.